(12) United States Patent
Bellert

(10) Patent No.: US 9,135,734 B2
(45) Date of Patent: Sep. 15, 2015

(54) RECURSIVE APPLICATION OF GROUP EFFECTS

(71) Applicant: Darrell Bellert, Boulder, CO (US)

(72) Inventor: Darrell Bellert, Boulder, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 312 days.

(21) Appl. No.: 13/754,372

(22) Filed: Jan. 30, 2013

(65) Prior Publication Data

US 2014/0210850 A1 Jul. 31, 2014

(51) Int. Cl.
*G06T 11/60* (2006.01)
*G06F 17/30* (2006.01)

(52) U.S. Cl.
CPC .......... *G06T 11/60* (2013.01); *G06F 17/30905* (2013.01)

(58) Field of Classification Search
CPC ......... G06T 11/30; G06T 15/50; G06T 15/80; G06T 7/004; G06T 7/0042; G09G 5/377; G09G 5/39; H04N 2201/3266; G06F 17/2247; G06F 17/211
See application file for complete search history.

(56) References Cited

U.S. PATENT DOCUMENTS

| | | | |
|---|---|---|---|
| 7,995,071 B2 * | 8/2011 | Guinan et al. | 345/581 |
| 8,767,008 B2 * | 7/2014 | Prebble et al. | 345/619 |
| 2008/0292215 A1 * | 11/2008 | Gaucas et al. | 382/298 |
| 2011/0113364 A1 * | 5/2011 | Neil et al. | 715/802 |

* cited by examiner

*Primary Examiner* — Antonio A Caschera
(74) *Attorney, Agent, or Firm* — Osha • Liang LLP

(57) ABSTRACT

A method for rendering a page including: obtaining an electronic document (ED) having: a container object with a first member and a second member; multiple shadow parameters defining a shadow of the container object; and multiple shadow parameters defining a shadow of solely the first member; determining a main bounding box surrounding the container object on the page but excluding the shadow of the first member; creating a main brush having the container object but excluding the shadow of the first member; calculating a shadow bounding box based on the main bounding box surrounding the container; creating a shadow brush by applying a shadow transformation matrix to the main brush having the container object; outputting the shadow of the first container object to a framebuffer for the page; and outputting, by processing the first member, the first member and the shadow of the first member to the framebuffer.

20 Claims, 8 Drawing Sheets

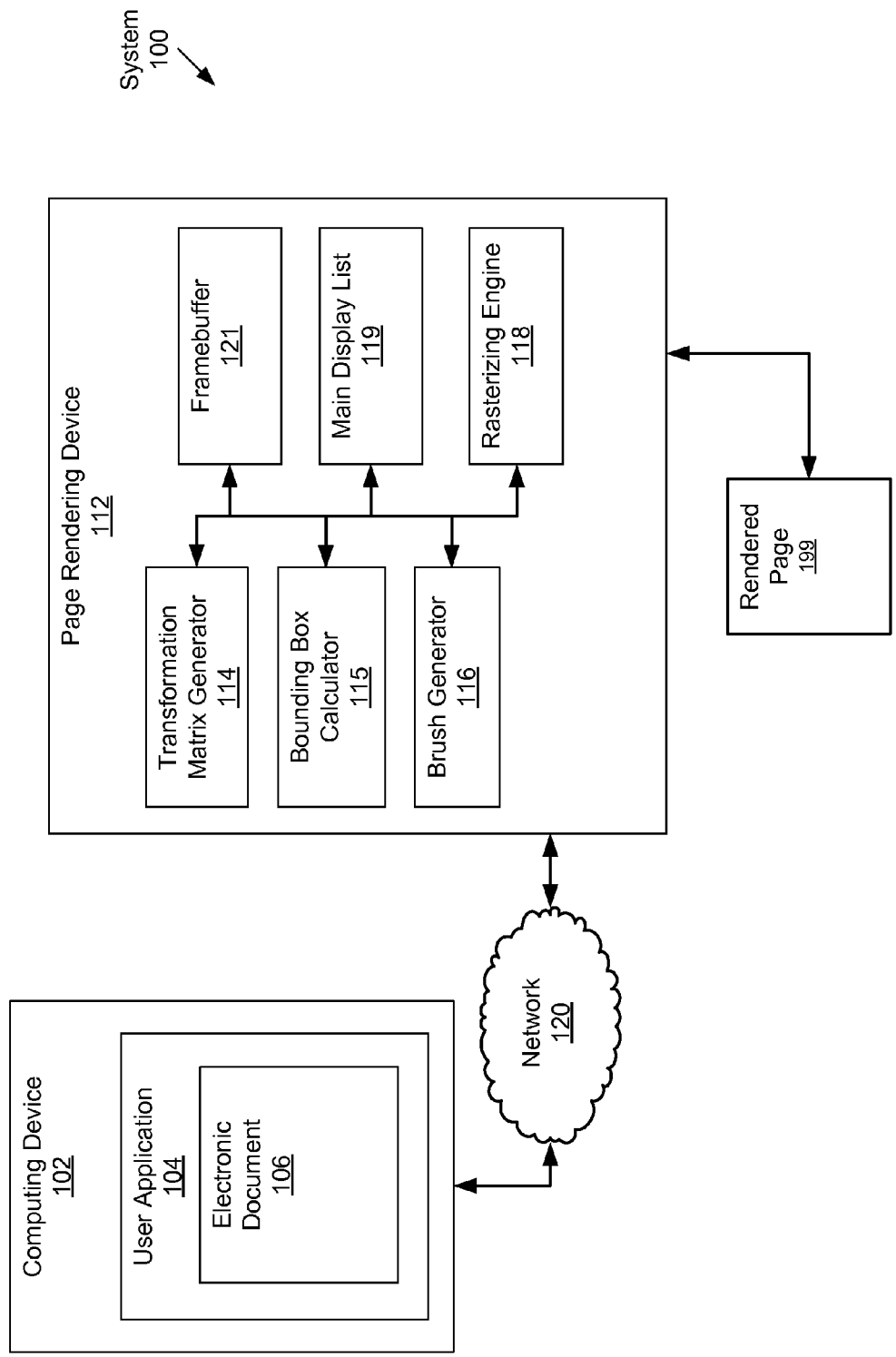

RECURSIVE APPLICATION OF GROUP EFFECTS

BACKGROUND

An electronic document (ED) may identify an object (e.g., text, images, and/or graphics) and define a variety of effects (e.g., outer shadows, reflections, etc.) to be applied to the object. It is the responsibility of a Page Rendering Device (PRD) or user machine to place the main objects and their effects on a page as specified by the ED.

Even though an ED may specify an object and the parameters associated with the one or more effects to be applied to the object, the bounding box surrounding the object might not be reliably specified by the document markup language (e.g., OOXML) of the ED. However, the rasterized object and its bounding box are needed to create the specified effects. For example, it is the object, as outputted (i.e., rasterized), that is reflected and/or shadowed, not the object in a pre-rasterized state. Regardless, users still like specifying effects to be applied to objects in an ED written in a document markup language.

SUMMARY

In general, in one aspect, the invention relates to a method for rendering a page. The method comprises: obtaining an electronic document (ED) comprising: a first container object comprising a first member and a second member; a plurality of first container shadow parameters defining a shadow of the first container object; and a first plurality of member shadow parameters defining a shadow of solely the first member; determining a main bounding box surrounding the first container object on the page but excluding the shadow of the first member; creating a main brush comprising the first container object but excluding the shadow of the first member; calculating a shadow bounding box based on the main bounding box surrounding the first container and at least one of the plurality of first container shadow parameters; creating a first shadow brush by applying a first shadow transformation matrix to the main brush comprising the first container object, wherein the first shadow transformation matrix maps the first container object to the shadow of the first container object; outputting the shadow of the first container object to a framebuffer for the page; and outputting, by processing the first member, the first member and the shadow of the first member to the framebuffer for the page.

In general, in one aspect, the invention relates to a non-transitory computer readable medium (CRM) storing instructions for rendering a page. The instructions comprise functionality for: obtaining an electronic document (ED) comprising: a first container object comprising a first member and a second member; a plurality of first container shadow parameters defining a shadow of the first container object; and a first plurality of member shadow parameters defining a shadow of solely the first member; determining a main bounding box surrounding the first container object on the page but excluding the shadow of the first member; creating a main brush comprising the first container object but excluding the shadow of the first member; calculating a shadow bounding box based on the main bounding box surrounding the first container and at least one of the plurality of first container shadow parameters; creating a shadow brush by applying a first shadow transformation matrix to the main brush comprising the first container object, wherein the first shadow transformation matrix maps the first container object to the shadow of the first container object; outputting the shadow of the first container object to a framebuffer for the page; and outputting, by processing the first member, the first member and the shadow of the first member to the framebuffer for the page.

In general, in one aspect, the invention relates to a system for rendering a page of an electronic document (ED). The system comprises: a hardware processor; a buffer storing the ED, wherein the ED comprises: a first container object comprising a first member and a second member; a plurality of first container shadow parameters defining a shadow of the first container object; and a first plurality of member shadow parameters defining a shadow of solely the first member; a bounding box calculator executing on the hardware processor and configured to: determine a main bounding box surrounding the first container object on the page but excluding the shadow of the first member; and calculate a shadow bounding box based on the main bounding box surrounding the first container object and at least one of the plurality of first container shadow parameters; a transformation matrix generator executing on the hardware processor and configured to calculate a first shadow transformation matrix mapping the first container object to the shadow of the first container object defined by the plurality of first container shadow parameters; a brush generator executing on the hardware processor and configured to: create a main brush comprising the first container object but excluding the shadow of the first member; and create a shadow brush by applying the first shadow transformation matrix to the main brush comprising the first container object; a framebuffer for the page comprising: the shadow of the first container object; the first member after processing the first member; and the shadow of the first member after processing the first member; and a rasterizing engine.

Other aspects of the invention will be apparent from the following description and the appended claims.

BRIEF DESCRIPTION OF DRAWINGS

FIG. 1 shows a block diagram depicting a system in accordance with one or more embodiments of the invention.

DETAILED DESCRIPTION

Figure 2A:
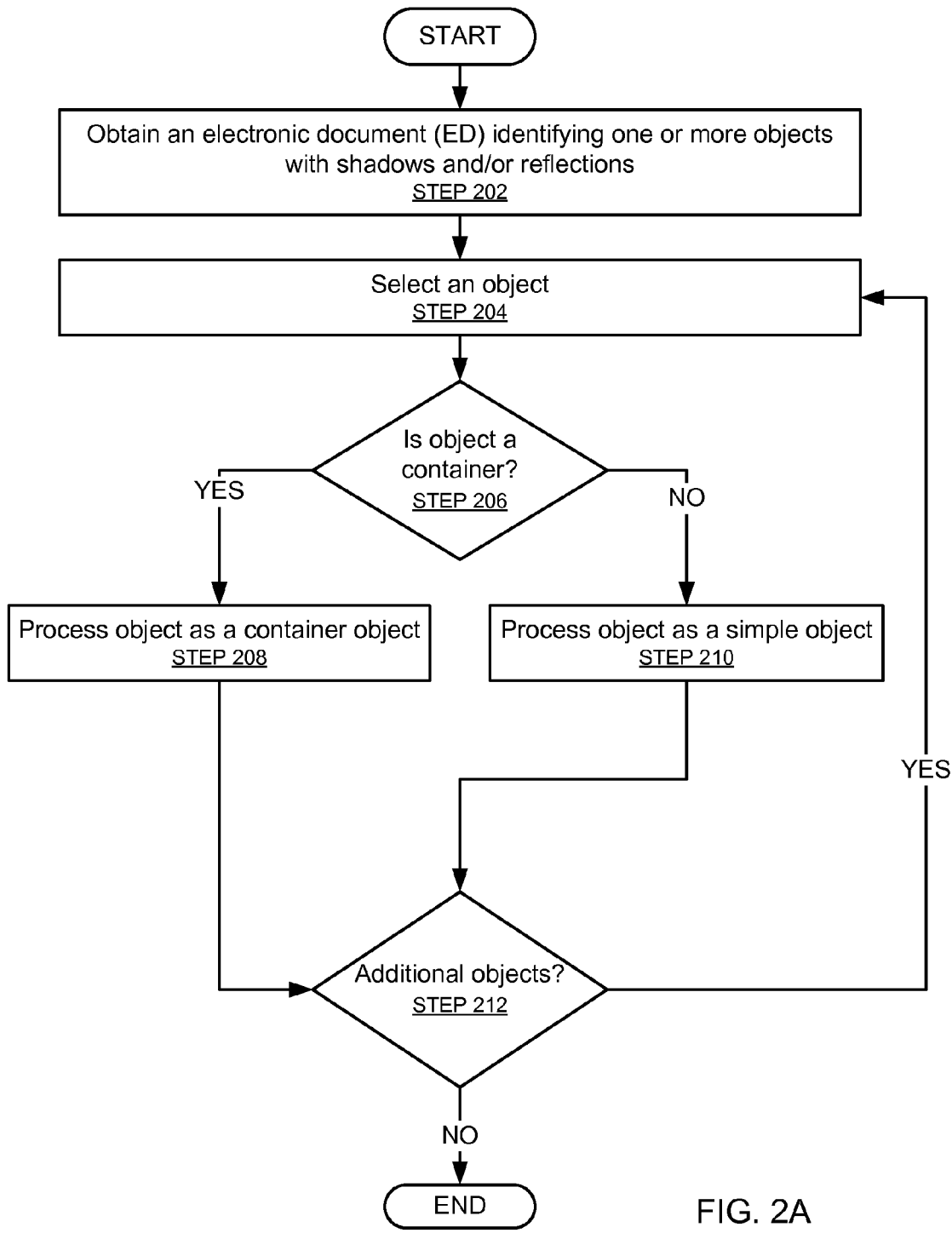
FIGS. 2A, 2B, 2C, and 2D show flowcharts in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for rendering a page of an ED. The ED includes at least one container object having multiple members. Each member may be a simple object or another (i.e., nested) container object. The ED may also identify shadow parameters and/or reflection parameters that are applicable to a container object or to a specific member within a container object. Each container object is processed by first disabling the shadow(s) and/or reflection(s) of its members. Once the shadow(s) and/or reflection(s) of the container object are outputted, then shadow(s) and/or reflection(s) of members are re-enabled. Each member is then processed to output the member and any shadow(s) and/or reflection(s) specific to the member.

FIG. 1 shows a system (100) in accordance with one or more embodiments of the invention. As shown in FIG. 1, the system (100) has multiple components including a page rendering device (PRD) (112) and a computing device (102). The PRD (112) may be a printer, an electronic reader, etc. The computing device (102) may be a personal computer (PC), a desktop computer, a mainframe, a server, a telephone, a kiosk, a cable box, a personal digital assistant (PDA), an electronic reader, a mobile phone, a smart phone, etc. There may be a direct connection (e.g., universal serial bus (USB) connection) between the computing device (102) and the PRD (112). Alternatively, the computing device (102) and the PRD (112) may be connected using a network (120) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)) having any number of pages. Accordingly, the user application (104) may be a word-processing application, a spreadsheet application, a desktop publishing application, a graphics application, a photograph printing application, an Internet browser, etc. The user application (104) may generate new EDs and/or obtain previously saved EDs. Although not shown in FIG. 1, the PRD (112) may include a buffer (i.e., memory) for storing the ED (106).

In one or more embodiments of the invention, the ED (106) includes one or more simple objects. Each simple object may correspond to any combination of text, images, and/or graphics to be displayed or printed on a page. Further, the ED (106) may specify one or more transformation parameters (i.e., rotation, scaling, skewing, translation, etc.) to be applied to the simple object. Further still, the ED (106) may also specify one or more effects (e.g., outer shadow, reflections, etc.) to be applied to the simple object.

In one or more embodiments of the invention, the ED (106) may include container objects corresponding to groups of simple objects and/or other container objects. In other words, a container object includes one or more members, and each member may be either a simple object or another (i.e., nested) container object. Further, the ED (106) may specify one or more effects (e.g., outer shadow, reflections, etc.) to be applied to the container object. The effects to be applied to the container object itself are independent of the effects to be applied to a specific member of the container in the ED.

In one or more embodiments of the invention, each effect is defined by one or more parameters. For example, the shadow effect is defined by multiple shadow parameters (e.g., color, transparency, blurring, skewing, scaling, shadow alignment, shadow direction, shadow offset distance, rotation, etc.). Similarly, the reflection(s) are defined by multiple reflection parameters (e.g., reflection offset distance, blurring, skewing, scaling, rotation, starting and ending alpha values for alpha gradient ramps, etc.).

In one or more embodiments of the invention, the ED (106) is represented/defined using a document markup language (e.g., ODF, OOXML, etc.). Accordingly, a container object, the parameters for the effects to be applied to the container object, the members of the container object, the parameters for the effects to be applied to the members, etc. may be recorded as attributes within the tags of the document markup language. Moreover, these attributes are needed to correctly render the ED (106) for display or printing.

In one or more embodiments of the invention, the PRD (112) includes a brush generator (116). A brush is a collection of objects that, once rasterized, can be used to paint geometry. Accordingly, a brush may be considered a stamp that may be transformed (e.g., scaled, skewed, rotated, etc.) before it is applied to a page (e.g., Rendered Page (199)). Moreover, a brush can include other brushes.

In one or more embodiments of the invention, the brush generator (116) is configured to create main brushes for simple objects and container objects specified in the ED (106). Further, the brush generator (116) is also configured to create shadow brushes for simple objects and container objects. The shadow brush for a simple object corresponds to the main brush for the simple object after applying a transformation defined by the shadow parameters of the simple object. Similarly, the shadow brush for a container object corresponds to the main brush for the container object after applying a transformation defined by the shadow parameters of the container object. For both simple objects and container objects, the shadow brush includes the color and transparency features defined by the shadow parameters. Further still, the brush generator (116) is also configured to create a linear gradient opacity brush based on the reflection parameters (i.e., starting and ending alpha values for alpha gradient ramps, etc.) of the container object or simple object.

In one or more embodiments of the invention, the PRD (112) includes a bounding box calculator (115). A bounding box may correspond to the rectangular footprint of an object on a page (e.g., Rendered Page (199)). Accordingly, a main object bounding box is a rectangular footprint of the simple object or container object on the page, a shadow bounding box is a rectangular footprint of the simple/container object's shadow on the page, a reflection bounding box is a rectangular footprint of the simpler/container object's reflection on the page, and the reflected shadow bounding box is a rectangular footprint of the shadow's reflection on the page. In general, bounding boxes are not visible on the rendered page (199).

In one or more embodiments of the invention, the bounding box calculator (115) is configured to calculate the shadow bounding box, the reflection bounding box, and the reflected shadow bounding box from the main bounding box, transformation data for the simple object or container object, and the shadow parameters and/or reflection parameters for the simple object or container object. The bounding box calculator may also be configured to determine the main object bounding box (discussed below).

In one or more embodiments of the invention, the PRD (112) includes a transformation matrix generator (114). The transformation matrix generator (114) is configured to calculate the mappings (i.e., transformation matrices) between the simple/container object and its shadow, the simple/container object and its reflection, and the shadow and its reflection. These transformation matrices may correspond to user-to-device matrices (i.e., converting from the user space of the ED (106) to the specific space used by the PRD (112)), user-tobrush matrices (i.e., converting from the user space of the ED (106) to a space used to define the brush), brush-to-brush matrices (i.e., converting from one brush space to another brush space), and brush-to-device matrices (i.e., converting from brush space to the specific space used by the PRD (112)). Further, these matrices are based on the shadow parameters and/or reflection parameters specified in the ED (106).

In one or more embodiments of the invention, the PRD (112) includes a framebuffer (121). The framebuffer (121) is configured to store the shadows and/or reflections of the container objects once they have been rendered. The frame buffer (121) is also configured to store the members of the container object and the shadows and/or reflections of the members once they have been rendered.

In one or more embodiments of the invention, the PRD (112) includes a main display list (119). The main display list corresponds to a series of instructions to be processed (i.e., executed, interpreted) by the rasterizing engine (118) in order to generate the rendered page (199). Accordingly, the main display list includes instructions (i.e., rasterizer instructions) to paint geometry corresponding to bounding boxes with specific brushes following specific transformations (discussed above).

In one or more embodiments of the invention, the PRD (112) includes a rasterizing engine (118). The rasterizing engine (118) consumes the instructions in the display list (119) to generate the framebuffer (121). The rasterizing engine (118) is configured to paint, in the rendered page (199), the main bounding box of a simple object with its main brush, paint the shadow bounding box associated with the simple object with its shadow brush, paint the reflection bounding box on the rendered page (199) with a transformed version of its main brush, and paint the reflected shadow bounding box on the page (199) with a transformed version of its shadow brush. Further still, the rasterizing engine (118) is also configured to paint a composite bounding box including the union of the reflection bounding box and the reflected shadow box with a linear gradient opacity brush.

FIG. 2A shows a flowchart for rendering a page in accordance with one or more embodiments of the invention. The process described in FIG. 2A may be executed using one or more of the components of the system (100), discussed above in reference to FIG. 1. Moreover, one or more of the steps in FIG. 2A may be repeated, omitted, and/or performed in parallel.

Initially, an ED identifying one or more objects is obtained (STEP 202). The ED may also identify shadow parameters and/or reflection parameters for each object. Example shadow parameters include color, transparency, blurring, skewing, scaling, shadow alignment, shadow direction, shadow offset distance, rotation, etc. Example reflection parameters may include reflection offset distance, blurring, skewing, scaling, rotation, starting and ending alpha values for alpha gradient ramps, etc. As discussed above, the ED is represented/defined using a document markup language (e.g., ODF, OOXML, etc.). Accordingly, the shadow parameters and/or the reflection parameters for each object in the ED may be recorded as attributes within the tags of the document markup language. The ED may be obtained by a page rendering device along with a request to render the ED.

In STEP 204, an object in the ED is selected. The object may be selected at random. Alternatively, the selected object may correspond to the latest object identified during a parsing of the ED.

In STEP 206, it is determined whether the object is a container object. As discussed above, each object identified by the ED is either a simple object or a container object. Each simple object may correspond to any combination of text, images, and/or graphics to be displayed or printed on a page. A container object has one or more members. Each member may be either a simple object or another (i.e., nested) container object. Simple objects and container objects may be identified from the tags and tag attributes of the ED. When it is determined that the selected object is a container object, the process proceeds to STEP 208. When it is determined that the selected object is not a container object (i.e., the selected object is a simple object), the process proceeds to STEP 210.

In STEP 208, the selected object is processed as a container object (discussed below). In STEP 210, the selected object is processed as a simple object (discussed below in reference to FIG. 2D).

In STEP 212, it is determined whether the ED has additional objects that have not yet been processed. When it is determined that the ED has additional objects requiring processing, the process returns to STEP 204. Otherwise, the process ends.

Figure 2B:
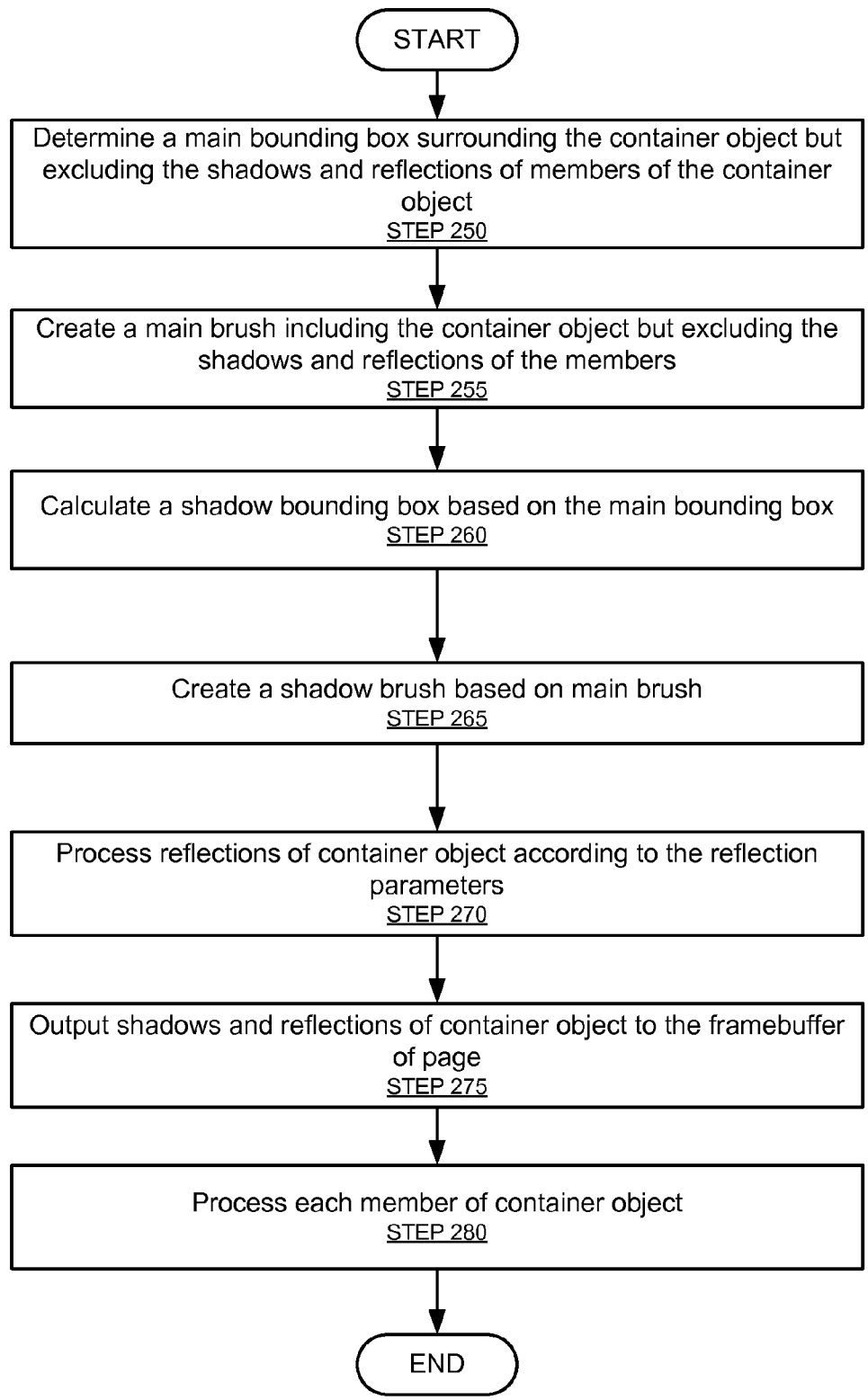

FIG. 2B shows a flowchart for processing a container object in accordance with one or more embodiments of the invention. In other words, the process depicted in FIG. 2B may be considered an expansion of STEP 208 in FIG. 2A. Moreover, the process described in FIG. 2B may be executed using one or more of the components of the system (100), discussed above in reference to FIG. 1. Further, one or more of the steps in FIG. 2B may be repeated, omitted, and/or performed in parallel.

Initially, a main bounding box surrounding the container object (i.e., all members of the container object) on the page is determined (STEP 250). The shadows and reflections specific to individual members of the container object are ignored/excluded/disabled during this determination. The main bounding box surrounding the container object may correspond to the union of the main bounding boxes surrounding individual members of the container object.

When a member is a nested container object, once the member's shadows and/or reflections have been disabled, it will be necessary to determine the bounding boxes for each member within the nested container object. The union of these bounding boxes may correspond to the bounding box surrounding the nested container object.

When a member is a simple object, once the member's shadows and/or reflections have been disabled, the member's bounding box may be determined by creating an auxiliary brush (i.e., a sizing brush group) for the member, and then obtaining the bounding box from the auxiliary brush (i.e., the bounding box is a property of the auxiliary brush that can be accessed) (discussed below in reference to FIG. 2D).

Continuing with FIG. 2B, in STEP 255, a main brush (i.e., a non-sizing brush) for the container object is created. The shadows and reflections specific to individual members of the container object are ignored/excluded/disabled during the creation of the main brush. The main brush for the container object is based on the main brushes of individual members within the container object.

When a member is a nested container object, once the member's shadows and/or reflections have been disabled, it will be necessary to create the main brushes for each member within the nested container object. The main brush for the nested container object is based on the main brushes of individual members within nested container object.

When a member is a simple object, once the member's shadows and/or reflections have been disabled, the member's main brush may be created by allocating a new brush and adding the display list objects (i.e., graphical primitives describing the container object) to the new brush (discussed below in reference to FIG. 2D).

In one or more embodiments of the invention, following creation of the container object's main brush, the shadows and/or reflections of the members within the container object are re-enabled.

In STEP 260, the shadow bounding box surrounding the shadow of the container object is calculated. Specifically, the shadow bounding box is calculated using the main bounding box and the shadow parameters for the container object identified in the ED. As discussed above, examples of shadow parameters include color, transparency, blurring, skewing, scaling, shadow alignment, shadow direction, shadow offset distance, rotation, etc.

In STEP 265, a shadow brush is created based on the container object. In one or more embodiments of the invention, creating the shadow brush includes: (a) allocating a new brush (i.e., shadow brush) that requires rasterization; (b) designating the allocated brush as an outer shadow and setting its color and transparency according to the shadow properties; (c) calculating a user-to-device transformation matrix for the shadow based on the shadow bounding box (STEP 260); (d) splitting the user-to-device transformation matrix into a user-to-brush transformation matrix and a brush-to-device transformation matrix; (e) creating a shadow transformation matrix by modifying the main brush's brush-to-device transformation matrix such that the rendered version of the container object will be transformed to produce the shadow (i.e., the shadow transformation matrix will translate, scale, and skew, etc., as defined by the shadow parameter(s), the rendered version of the container object); and (f) adding the display list objects to the shadow brush. Item (f) includes setting, as the current fill attribute, the main brush; and filling the area containing the outer shadow. The current fill attribute defines how subsequent geometry should be filled. For example, geometry can be filled with a brush, a solid color, a gradient, or an image.

In STEP 270, the reflections of the container object are processed according to the reflection parameters (discussed below). In STEP 275, the shadows and reflections of the container object are output to the framebuffer of the page. However, the container object itself is not output to the framebuffer at STEP 275.

In STEP 280, each member of the container object is processed with its reflections and shadows enabled. As discussed above, each member of the container object may be a simple object or another (i.e., nested) container object. When the member itself is a (nested) container object, the steps of FIG. 2B are repeated for the member (i.e., the process of FIG. 2B is recursive). The processing of a simple object is discussed below.

Figure 2C:
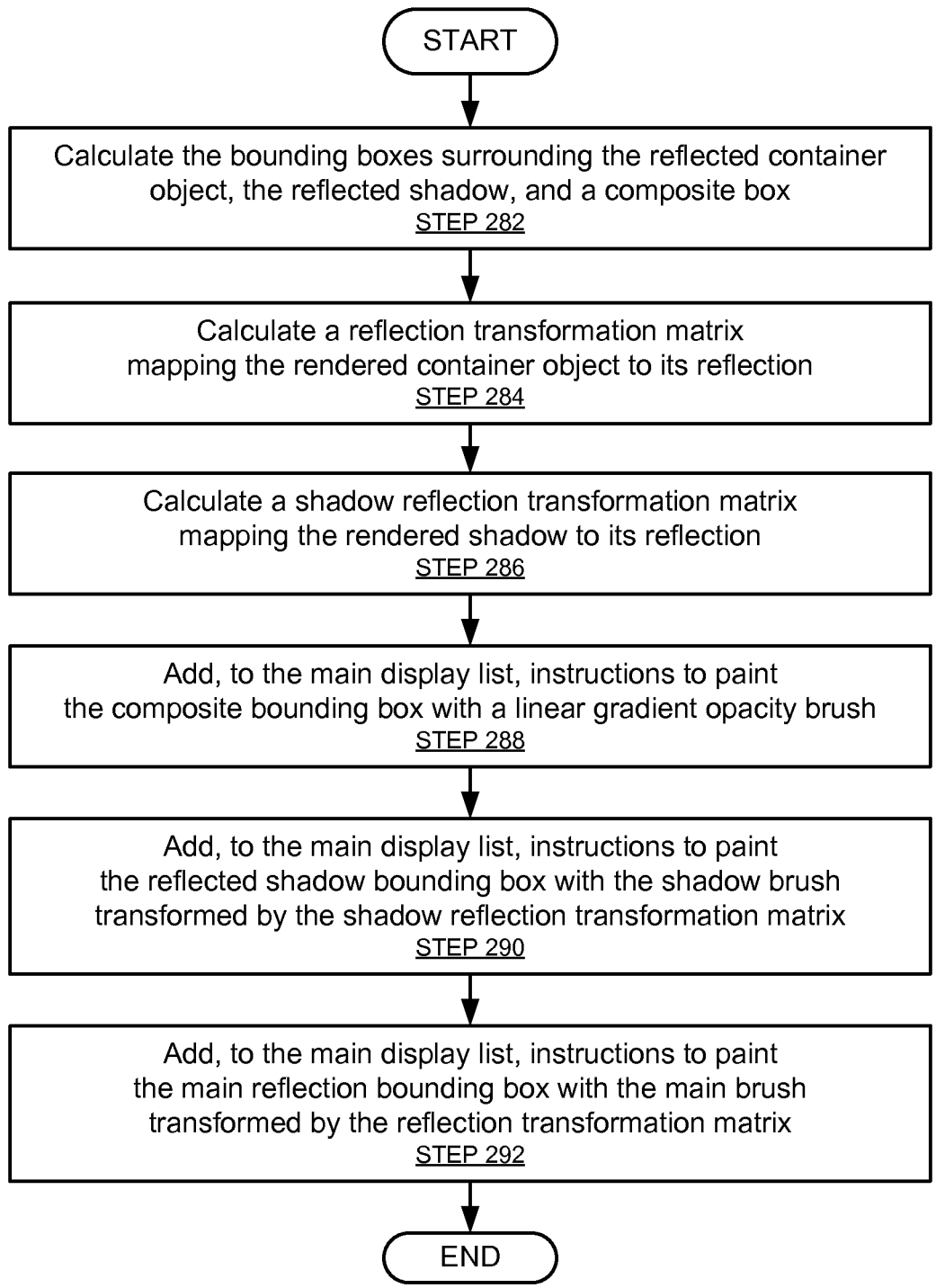

FIG. 2C shows a flowchart for processing reflections of a container object in accordance with one or more embodiments of the invention. In other words, the process depicted in FIG. 2C may be considered an expansion of STEP 270 in FIG. 2B. Moreover, the process described in FIG. 2C may be executed using one or more of the components of the system (100), discussed above in reference to FIG. 1. Further, one or more of the steps in FIG. 2C may be repeated, omitted, and/or performed in parallel.

Initially, the bounding boxes surrounding the reflected container object (i.e., reflection bounding box) and the reflected shadow (i.e. reflected shadow bounding box) are calculated (STEP 282). Specifically, the reflection bounding box is calculated based on the main bounding box and the reflection parameters identified in the ED. Similarly, the reflected shadow bounding box is calculated based on the shadow bounding box, the main bounding box, and the reflection parameters of the container object identified in the ED. In addition, a composite box corresponding to the union of the reflection bounding box and the reflected shadow bounding box is calculated.

In STEP 284, a reflection transformation matrix mapping the container object to its reflection is calculated. The reflection transformation matrix must appropriately transform (i.e., translate, scale, flip, skew, rotate, etc.) the main brush to produce the reflection defined by the reflection parameters in the ED.

In STEP 286, a shadow reflection transformation matrix mapping the shadow to its reflection is calculated. The shadow reflection transformation matrix must appropriately transform (i.e., translate, scale, flip, skew, rotate, etc.) the shadow brush to produce the shadow reflection defined by the reflection parameters in the ED.

In STEP 288, instructions to paint the composite bounding box (i.e., the aggregate of the reflection bounding box and the reflected shadow bounding box) with a linear gradient opacity (LGO) brush are added to a main display list. The LGO brush adds a transparency gradient effect to the reflections. By applying the LGO brush over the composite bounding box, the reflection of the container object and the reflected shadow are effectively treated as a single object, and the transparency will vary smoothly over both the reflection and the shadow reflection.

In STEP 290, instructions to paint the reflected shadow bounding box with the shadow brush transformed by the shadow reflection transformation matrix are added to the main display list. In other words, the instructions are to fill the reflected shadow bounding box with the shadow brush, appropriately transformed. In STEP 292, instructions to paint the main reflection bounding box with the main brush transformed by the reflection transformation matrix are added to the main display list. In other words, the instructions are to fill the main reflection bounding box with the main brush, appropriately transformed.

Figure 2D:
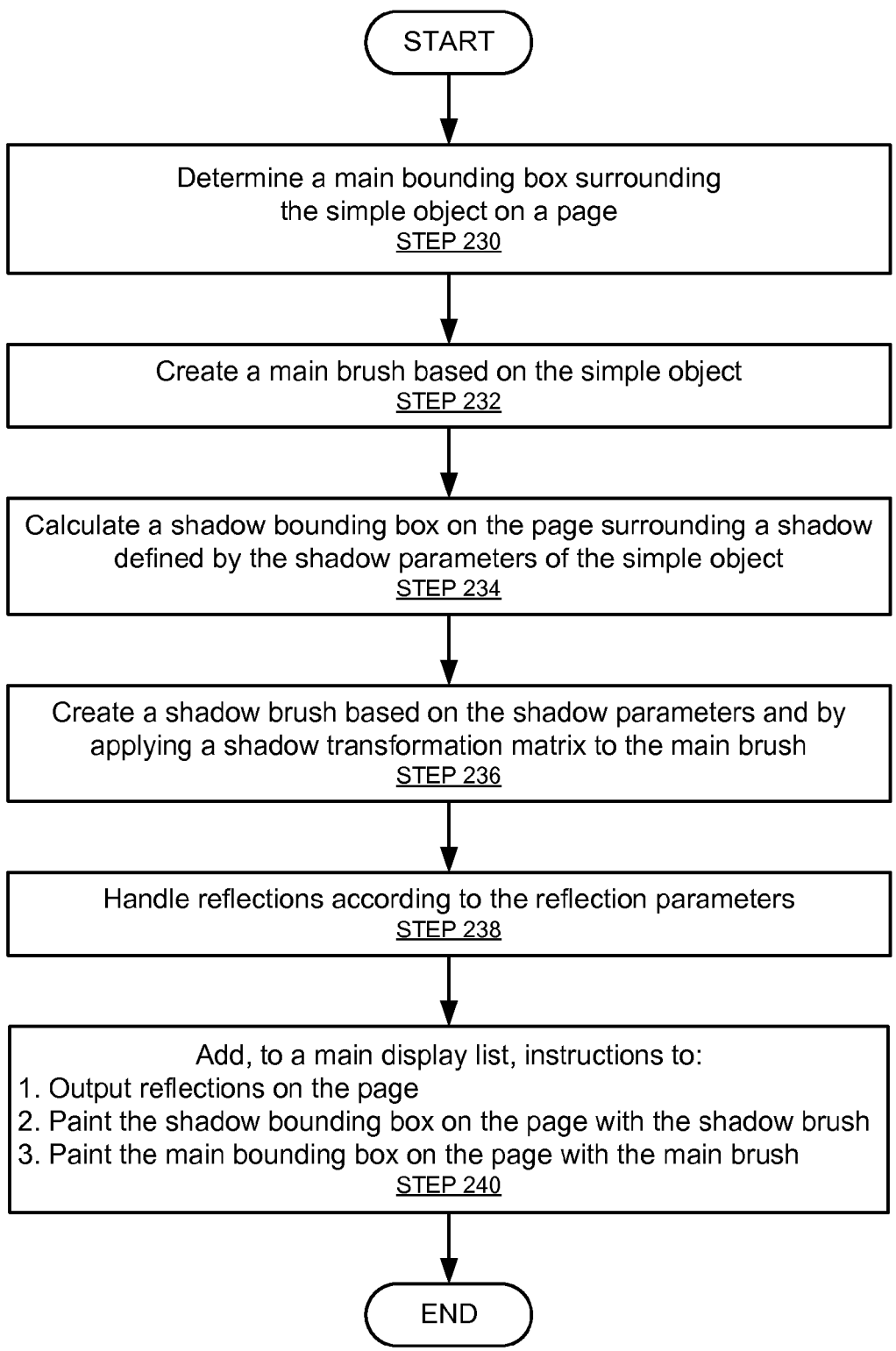

FIG. 2D shows a flowchart for processing a simple object in accordance with one or more embodiments of the invention. In other words, the process depicted in FIG. 2D may be considered an expansion of STEP 210 in FIG. 2A. Moreover, the process described in FIG. 2D may be executed using one or more of the components of the system (100), discussed above in reference to FIG. 1. Further, one or more of the steps in FIG. 2D may be repeated, omitted, and/or performed in parallel.

In STEP 230, a main bounding box surrounding the simple object on the page is determined. As the main bounding box is not reliably specified by the ED, the main bounding box may be determined by creating an auxiliary brush (i.e., a sizing brush group) for the simple object, and then obtaining the bounding box from the auxiliary brush (i.e., the bounding box is a property of the auxiliary brush that can be accessed). In one or more embodiments of the invention, determining the main bounding box includes: (i) calculating a viewbox (i.e., a rectangular geometric area which is used to define the initial area of the brush; a window which identifies the contents of the brush) sufficiently large to encompass the largest allowable simple object; (ii) creating the auxiliary brush using the viewbox and by specifying that the bounding box of the auxiliary brush should be derived from the contents of the auxiliary brush; and (iii) converting the bounding box of the auxiliary brush from brush space to user space. This bounding box is the main bounding box prior (i.e., main_bbox_prior) to applying user-space transformations, if any, derived from the simple object's transformations identified in the ED. The main bounding box after (i.e., main_bbox_after) applying user-space transformations derived from the simple object's transformations, if any, is also calculated.

In one or more embodiments of the invention, creating the auxiliary brush (i.e., item (ii)) includes: (a) allocating a new brush object (i.e., the auxiliary brush) that does not require rasterization; (b) creating a user-to-device transformation matrix for the simple object in view of the simple object's transformation parameters, if any, identified within the ED; (c) splitting the user-to-device transformation matrix into a user-to-brush transformation matrix and a brush-to-device transformation matrix, taking into account the calculated viewbox of item (i); (d) initializing the auxiliary brush's bounding box to be calculated based on its contents; and (e) adding the graphical data of the simple object to the auxiliary brush by outputting the graphical data of the simple object in view of the user-to-brush matrix of item (c). Item (e) causes the bounding box of the brush to be computed based upon the graphical data of the simple object (i.e., the brush's contents). Item (e) does not result in a new display list being constructed.

Still referring to FIG. 2D, in STEP 232, a main brush (i.e., a non-sizing brush) for the simple object is created. Specifically, the main brush is created using a viewbox corresponding to the determined main bounding box (i.e., main_bbox_p-rior) (i.e., STEP 210), but slightly larger to compensate for minor rounding errors. In one or more embodiments of the invention, creating the main brush includes: (a) allocating a new brush (i.e., main brush) that requires rasterization; (b) creating a user-to-device transformation matrix for the simple object in view of the transformation parameters, if any, identified within the ED; (c) splitting the user-to-device transformation matrix into a user-to-brush transformation matrix and a brush-to-device transformation matrix, taking into account the calculated viewbox; and (d) adding the display list objects (i.e., graphical primitives describing the simple object) to the main brush. Item (d) includes initializing the main brush's bounding box to be calculated based on the viewbox; and outputting the graphical data of the simple object in view of the user-to-brush matrix of item (c).

In STEP 234, the shadow bounding box surrounding the shadow defined by shadow parameters is calculated. Specifically, the shadow bounding box is calculated using the main bounding box (i.e., main_bbox_after), the simple object transformations identified in the ED (if any), and the shadow parameters identified in the ED. As discussed above, examples of shadow parameters include color, transparency, blurring, skewing, scaling, shadow alignment, shadow direction, shadow offset distance, rotation, etc. A viewbox is subsequently calculated for the shadow based on the shadow bounding box.

In STEP 236, a shadow brush is created. In one or more embodiments of the invention, creating the shadow brush includes: (a) allocating a new brush (i.e., shadow brush) that requires rasterization; (b) designating the allocated brush as an outer shadow and setting its color and transparency according to the shadow properties; (c) calculating a user-to-device transformation matrix for the shadow based on the shadow bounding box (STEP 234); (d) splitting the user-to-device transformation matrix into a user-to-brush transformation matrix and a brush-to-device transformation matrix, taking into account the calculated viewbox; (e) creating a shadow transformation matrix by modifying the main brush's brush-to-device transformation matrix such that the rendered version of the simple object will be transformed to produce the shadow (i.e., the shadow transformation matrix will translate, scale, and skew, etc., as defined by the shadow parameter(s), the rendered version of the simple object); and (f) adding the display list objects to the shadow brush. Item (f) includes setting, as the current fill attribute, the main brush; and filling the area containing the outer shadow. The current fill attribute defines how subsequent geometry should be filled. For example, geometry can be filled with a brush, a solid color, a gradient, or an image.

Those skilled in the art, having the benefit of this detailed description, will appreciate that STEP 234 and STEP 236 may be omitted if no shadow for the simple object exists or if the shadow for the simple object has been disabled.

In STEP 238, the reflections are processed according to the reflection parameters. Execution of STEP 238 may be essentially the same as the process depicted in FIG. 2C, except that it is the simple object and its bounding box, the shadow of the simple object and its bounding box, and the reflection parameters of the simple object that are being processed/used to generate the reflections. Those skilled in the art, having the benefit of this detailed description, will appreciate that STEP 238 may be omitted if no reflections for the simple object exist or if the reflections for the simple object have been disabled.

In STEP 240, instructions are added to the main display list to: (i) output reflections (if any) onto the page; (ii) paint (if a shadow exists) the shadow bounding box on the page with the shadow brush (i.e., set, as the current fill attribute, the shadow brush and fill the area enclosed by the shadow bounding box); and (iii) paint the main bounding box (i.e., main_bbox_after) on the page with the main brush (i.e., set, as the current fill attribute, the main brush and fill the area enclosed by the main bounding box (i.e., main_bbox_after)).

In one or more embodiments of the invention, the main brush is rendered into an intermediary frame buffer followed by the shadow brush (i.e., two intermediary frame buffers will exist). The first intermediary frame buffer will be a visual representation of the simple object; and the second intermediary frame buffer will be a transformed copy of the first but with the color values changed according to the shadow parameters. The contents of the first and second intermediary frame buffers are then used as indicated in the commands in the main display list to render onto the page the simple object with its shadow and reflections.

Figure 3:
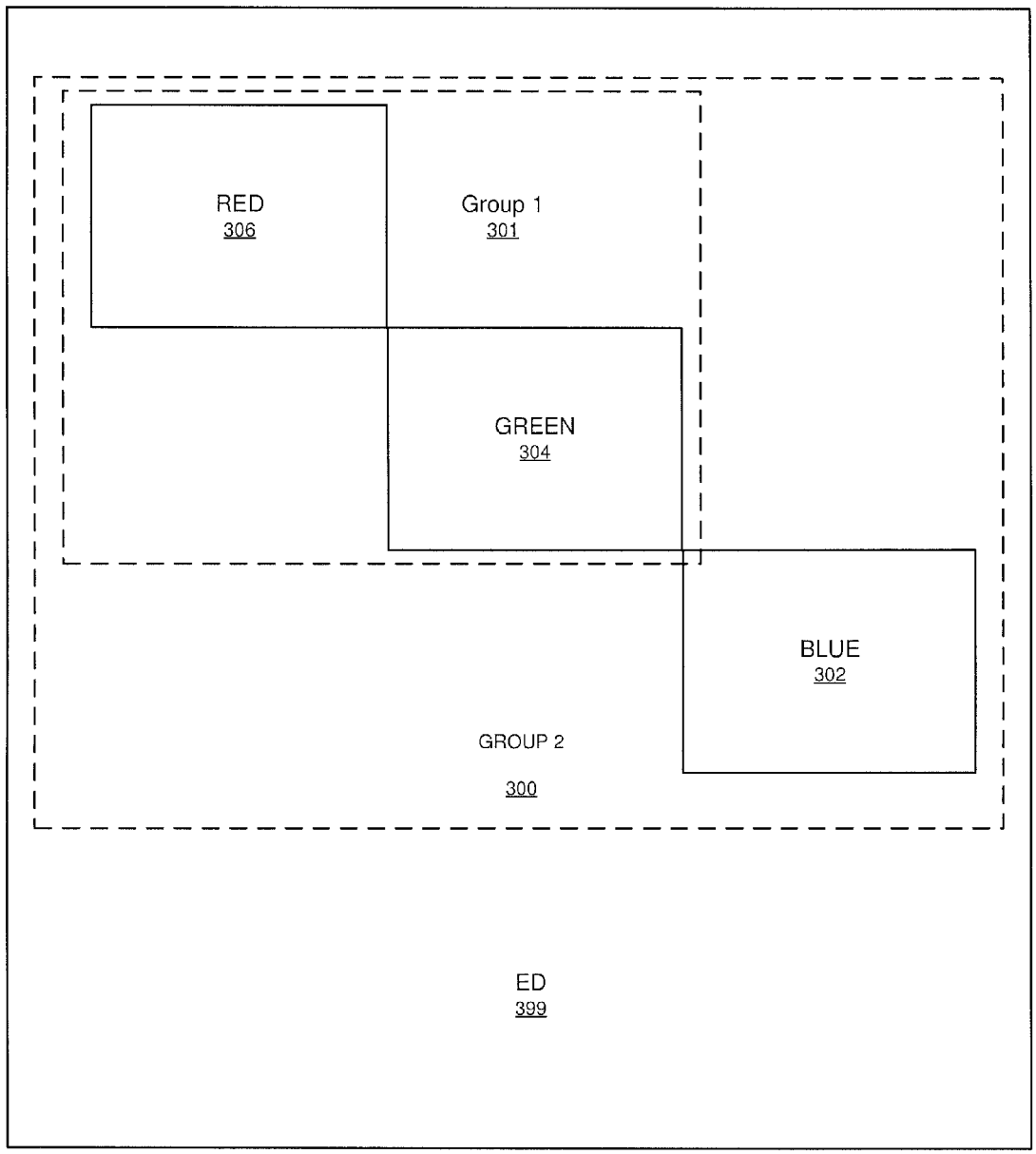
FIGS. 3 and 4 show examples in accordance with one or more embodiments of the invention.

FIG. 3 shows an example in accordance with one or more embodiments of the invention. As shown in FIG. 3, the ED (399) identifies two container objects: Group 1 (301) and Group 2 (300). Group 1 (301) includes two members: a red square (306) and a green square (304). Group 2 (300) includes two members: a blue square (302) and Group 1 (301). In other words, Group 1 (301) is a nested container object within Group 2 (300). The red square (306), the green square (304), and the blue square (302) are simple objects.

Assume the ED (399) specifies a shadow and a reflection are to be applied to Group 2 (300). Further, assume the ED (399) specifies a shadow and reflection are to be applied to Group 1 (301). Further still, assume the ED (399) specifies that each of the simple objects (302, 304, 306) has a shadow.

Figure 4:
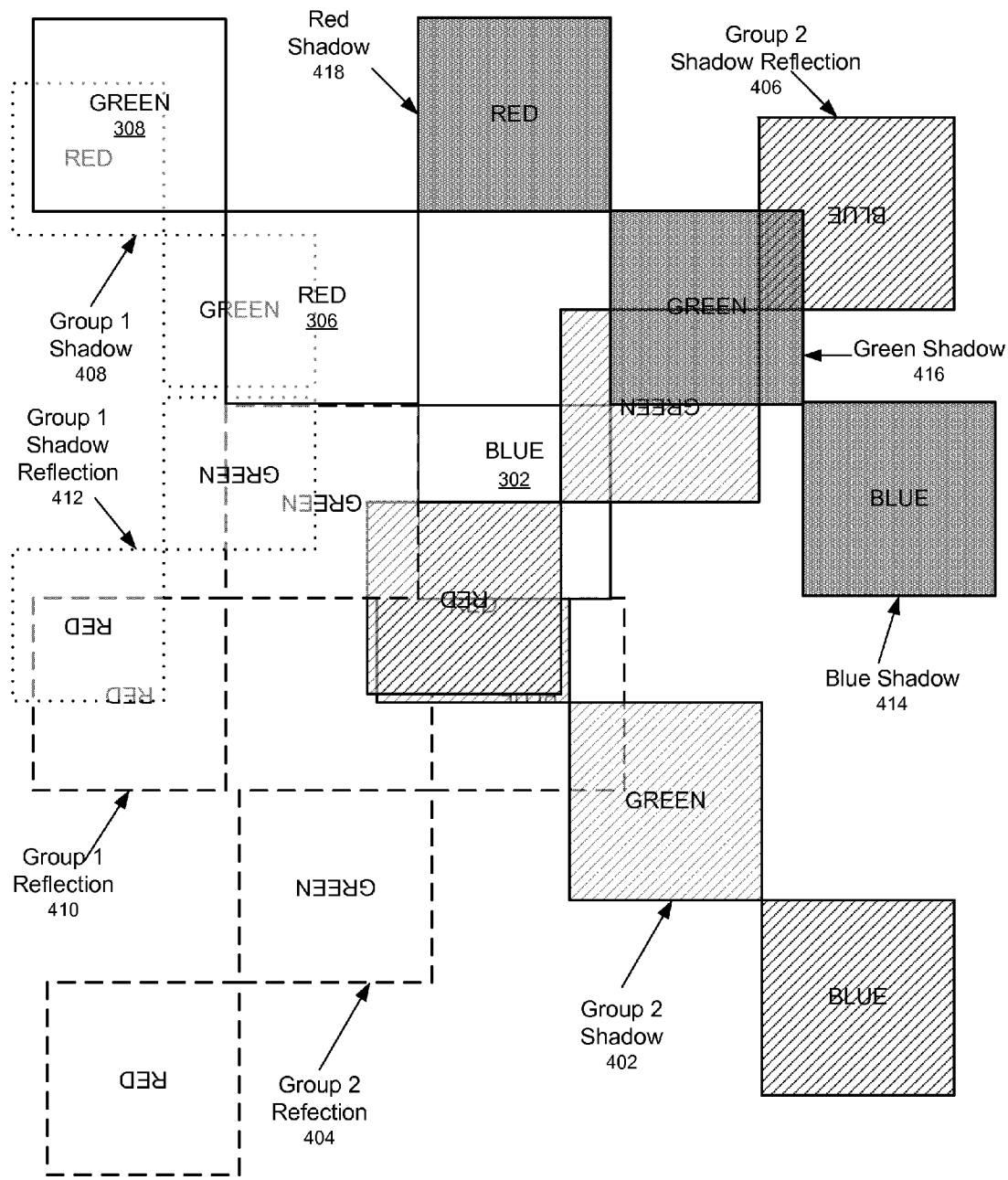

FIG. 4 shows an example in accordance with one or more embodiments of the invention. Specifically, FIG. 4 depicts the framebuffer for the page following the application of the recursive processes depicted in FIGS. 2A, 2B, 2C, and 2D to the ED (399). Initially, the Group 2 Shadow (402), the Group 2 Reflection (404), and the Group 2 Shadow Reflection (406) are output to the framebuffer. Now, each member of Group 2 (300) (i.e., Blue Square (302) and Group 1 (301)) is processed. Accordingly, the blue square (302) and its shadow (i.e., Blue Square Shadow (414)) are output to the framebuffer. Then, the Group 1 Shadow (408), the Group 1 Reflection (410), and the Group 1 Shadow Reflection (412) are output to the framebuffer. Now, each member of Group 1 (301) (Red Square (306), Green Square (304) is processed. Accordingly, the red square (306) and the green square (304) and their individual shadows (i.e., Green Shadow (416), Red Shadow (418)) are output to the framebuffer.

As shown in FIG. 4, the addition of the shadow (402) and reflection (404) on Group 2 (300) does not affect the shadow (408) and reflection (410) on Group 1 (301) nor the shadows (414, 416, 418) on the original simple objects (302, 304, 306). Furthermore, note that the shadows and reflections on group members are ignored when applying a group's shadow and reflection. To illustrate this, note that the shadows (416, 418) of Group 1's members (304, 306) are themselves NOT shadowed nor reflected as part of the Group 1 shadow and reflection. The group shadow and reflection operates on just the members of the group and not the member's shadow and reflection.

Embodiments of the invention have one or more of the following advantages: the ability to specify/apply shadows and reflections for/to a group that do not operate on the individual shadows or reflections of each member; the ability to create shadows for a container/simple object; the ability to create reflections for the container/simple object and/or the shadow of the container/simple object; the ability to create the reflections and the shadow based on a main brush comprising the simple/container object; etc.

Figure 5:
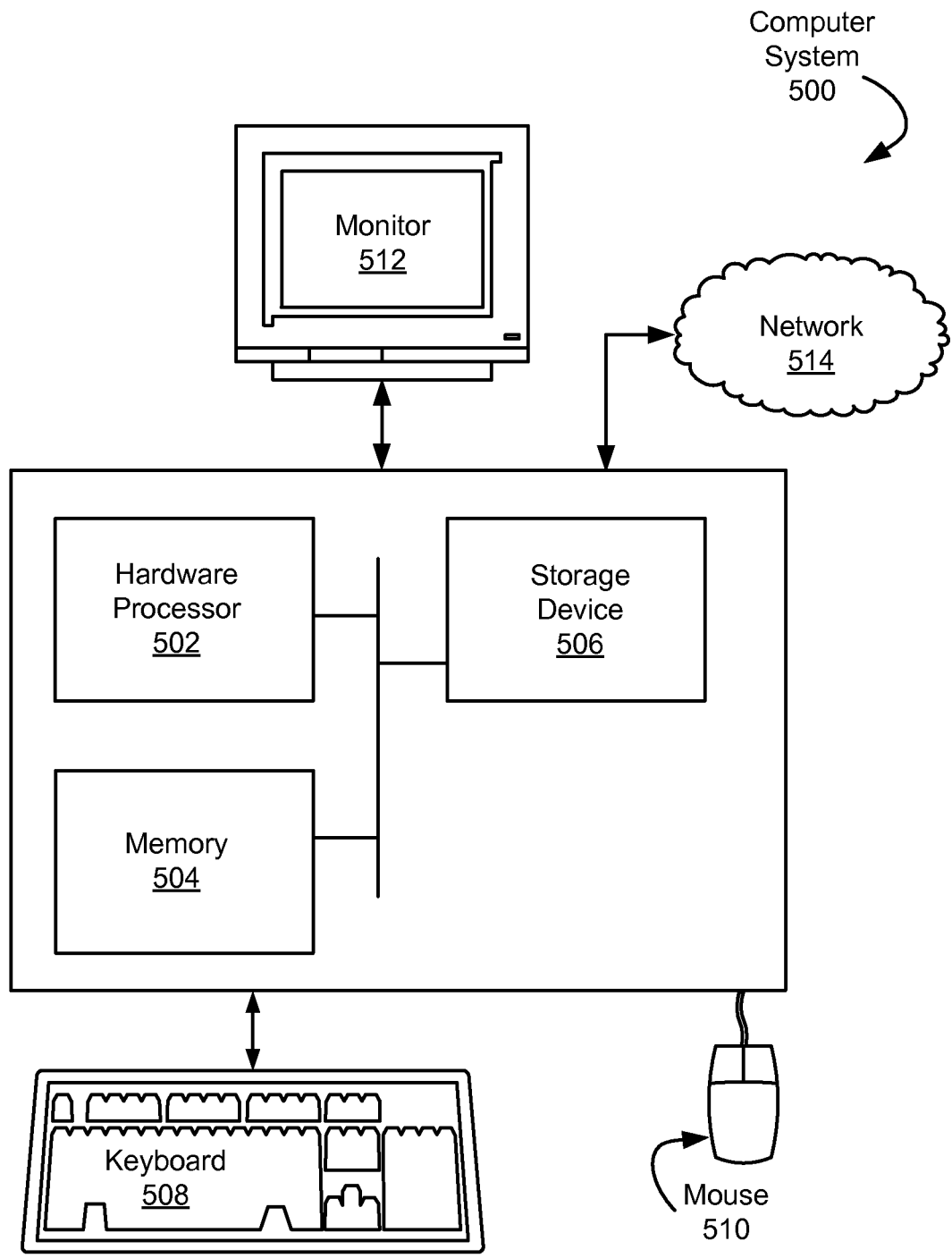
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more hardware processor(s) (502) (such as a central processing unit (CPU), integrated circuit, etc.), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible non-transitory computer readable storage medium, such as a compact disc (CD), a diskette, a tape, a hard drive, punch cards, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rendering a page, comprising:
obtaining an electronic document (ED) comprising:
a first container object comprising a first member and a second member;
a plurality of first container shadow parameters defining a shadow of the first container object; and
a first plurality of member shadow parameters defining a shadow of solely the first member;
determining a main bounding box surrounding the first container object on the page but excluding the shadow of the first member;
creating a main brush comprising the first container object but excluding the shadow of the first member;
calculating, by a hardware processor, a shadow bounding box based on the main bounding box surrounding the first container and at least one of the plurality of first container shadow parameters;
creating a first shadow brush by applying a first shadow transformation matrix to the main brush comprising the first container object, wherein the first shadow transformation matrix maps the first container object to the shadow of the first container object;
outputting the shadow of the first container object to a framebuffer for the page; and
outputting, by processing the first member, the first member and the shadow of the first member to the framebuffer for the page.

2. The method of claim 1, wherein the plurality of first container shadow parameters comprises at least one selected from a group consisting of: shadow alignment, shadow direction, shadow offset distance, color, and transparency.

3. The method of claim 1, further comprising:
calculating a reflection bounding box for a reflection of the first container object based on a plurality of reflection parameters specified in the ED;
calculating a reflection transformation matrix mapping the first container object to the reflection of the first container object defined by the plurality of reflection parameters; and
outputting the reflection of the first container object to the framebuffer for the page.

4. The method of claim 3, wherein the plurality of reflection parameters comprises at least one selected from a group consisting of scaling, skewing, and an alpha gradient ramp value.

5. The method of claim 3, further comprising:
calculating a reflected shadow bounding box based on the plurality of reflection parameters;
calculating a shadow reflection transformation matrix mapping the shadow of the first container to a shadow reflection defined by the plurality of reflection parameters;
calculating a composite bounding box comprising the reflection bounding box and the reflected shadow bounding box; and generating a plurality of instructions to:
   create a linear gradient opacity brush over the composite bounding box; and
   paint the reflected shadow bounding box with the shadow brush after applying the shadow reflection transformation matrix to the shadow brush.

6. The method of claim 3, wherein the second member is a second container object comprising a third member, and wherein the ED further comprises:
   a plurality of second container shadow parameters defining a shadow of the second container object; and
   a second plurality of member shadow parameters defining a shadow of solely the third member.

7. The method of claim 6, further comprising:
   determining a main bounding box surrounding the second container object on the page but excluding the shadow of the third member;
   creating a main brush comprising the second container object but excluding the shadow of the third member;
   calculating a shadow bounding box based on the main bounding box surrounding the second container object and at least one of the plurality of second container shadow parameters;
   creating a shadow brush by applying a second shadow transformation matrix to the main brush comprising the second container object, wherein the second shadow transformation matrix maps the second container object to the shadow of the second container object;
   outputting the shadow of the second container object to the framebuffer for the page; and
   outputting, by processing the third member, the third member and the shadow of the third member to the framebuffer for the page.

8. The method of claim 1, wherein processing the first member comprises:
   determining a main bounding box surrounding the first member on the page, wherein the first member is a simple object;
   creating a main brush comprising the first member;
   calculating a shadow bounding box of the first member based on the main bounding box surrounding the first member and at least one of the first plurality of member shadow parameters;
   creating a shadow brush by applying a shadow mapping to the main brush comprising the first member, wherein the shadow mapping transforms the first member to the shadow of the first member defined by the first plurality of member shadow parameters; and
   generating a first plurality of instructions to:
      paint the shadow bounding box of the first member with the shadow brush; and
      paint the main bounding box surrounding the first member with the main brush comprising the first member.

9. The method of claim 8, further comprising:
   calculating a reflection bounding box of the first member based on a plurality of reflection parameters of the first member specified in the ED;
   calculating a reflection transformation matrix mapping from the first member to a reflection of the first member defined by the plurality of reflection parameters of the first member; and
   generating a second plurality of instructions to:
      paint the reflection bounding box of the first member with the main brush comprising the first member after applying the reflection mapping to the main brush comprising the first member.

10. A non-transitory computer readable medium (CRM) storing instructions for rendering a page, the instructions comprising functionality for:
   obtaining an electronic document (ED) comprising:
      a first container object comprising a first member and a second member;
      a plurality of first container shadow parameters defining a shadow of the first container object; and
      a first plurality of member shadow parameters defining a shadow of solely the first member;
   determining a main bounding box surrounding the first container object on the page but excluding the shadow of the first member;
   creating a main brush comprising the first container object but excluding the shadow of the first member;
   calculating a shadow bounding box based on the main bounding box surrounding the first container and at least one of the plurality of first container shadow parameters;
   creating a shadow brush by applying a first shadow transformation matrix to the main brush comprising the first container object, wherein the first shadow transformation matrix maps the first container object to the shadow of the first container object;
   outputting the shadow of the first container object to a framebuffer for the page; and
   outputting, by processing the first member, the first member and the shadow of the first member to the framebuffer for the page.

11. The non-transitory CRM of claim 10, the instructions further comprising functionality for:
   calculating a reflection bounding box for a reflection of the first container object based on a plurality of reflection parameters specified in the ED;
   calculating a reflection transformation matrix mapping the first container object to the reflection of the first container object defined by the plurality of reflection parameters; and
   outputting the reflection of the first container object to the framebuffer for the page.

12. The non-transitory CRM of claim 11, the instructions further comprising functionality for:
   calculating a reflected shadow bounding box based on the plurality of reflection parameters;
   calculating a shadow reflection transformation matrix mapping the shadow of the first container to a shadow reflection defined by the plurality of reflection parameters;
   calculating a composite bounding box comprising the reflection bounding box and the reflected shadow bounding box; and
   generating a plurality of instructions to:
      create a linear gradient opacity brush over the composite bounding box; and
      paint the reflected shadow bounding box with the shadow brush after applying the shadow reflection transformation matrix to the shadow brush.

13. The non-transitory CRM of claim 10, wherein the second member is a second container object comprising a third member, and wherein the ED further comprises:
   a plurality of second container shadow parameters defining a shadow of the second container object; and
   a second plurality of member shadow parameters defining a shadow of solely the third member.

14. The non-transitory CRM of claim 13, the instructions further comprising functionality for:
   determining a main bounding box surrounding the second container object on the page but excluding the shadow of the third member;
   creating a main brush comprising the second container object but excluding the shadow of the third member;
   calculating a shadow bounding box based on the main bounding box surrounding the second container object and at least one of the plurality of second container shadow parameters;
   creating a shadow brush by applying a second shadow transformation matrix to the main brush comprising the second container object, wherein the second shadow transformation matrix maps the second container object to the shadow of the second container object;
   outputting the shadow of the second container object to the framebuffer for the page; and
   outputting, by processing the third member, the third member and the shadow of the third member to the framebuffer for the page.

15. The non-transitory CRM of claim 10, wherein the instructions for processing the first member further comprise functionality for:
   determining a main bounding box surrounding the first member on the page, wherein the first member is a simple object;
   creating a main brush comprising the first member;
   calculating a shadow bounding box of the first member based on the main bounding box surrounding the first member and at least one of the first plurality of member shadow parameters;
   creating a shadow brush by applying a shadow mapping to the main brush comprising the first member, wherein the shadow mapping transforms the first member to the shadow of the first member defined by the first plurality of member shadow parameters; and
   generating a first plurality of instructions to:
      paint the shadow bounding box of the first member with the shadow brush; and
      paint the main bounding box surrounding the first member with the main brush comprising the first member.

16. The non-transitory CRM of claim 15, the instructions further comprising functionality for:
   calculating a reflection bounding box of the first member based on a plurality of reflection parameters of the first member specified in the ED;
   calculating a reflection transformation matrix mapping from the first member to a reflection of the first member defined by the plurality of reflection parameters of the first member; and
   generating a second plurality of instructions to:
      paint the reflection bounding box of the first member with the main brush comprising the first member after applying the reflection mapping to the main brush comprising the first member.

17. A system for rendering a page of an electronic document (ED), comprising:
   a hardware processor;
   a buffer storing the ED, wherein the ED comprises:
      a first container object comprising a first member and a second member;
      a plurality of first container shadow parameters defining a shadow of the first container object; and
      a first plurality of member shadow parameters defining a shadow of solely the first member;
   a bounding box calculator executing on the hardware processor and configured to:
      determine a main bounding box surrounding the first container object on the page but excluding the shadow of the first member; and
      calculate a shadow bounding box based on the main bounding box surrounding the first container object and at least one of the plurality of first container shadow parameters;
   a transformation matrix generator executing on the hardware processor and configured to calculate a first shadow transformation matrix mapping the first container object to the shadow of the first container object defined by the plurality of first container shadow parameters;
   a brush generator executing on the hardware processor and configured to:
      create a main brush comprising the first container object but excluding the shadow of the first member; and
      create a shadow brush by applying the first shadow transformation matrix to the main brush comprising the first container object;
   a framebuffer for the page comprising:
      the shadow of the first container object;
      the first member after processing the first member; and
      the shadow of the first member after processing the first member; and
   a rasterizing engine.

18. The system of claim 17, wherein the second member is a second container object comprising a third member, and wherein the ED further comprises:
   a plurality of second container shadow parameters defining a shadow of the second container object; and
   a second plurality of member shadow parameters defining a shadow of solely the third member.

19. The system of claim 18, wherein:
   the bounding box calculator is further configured to:
      determine a main bounding box surrounding the second container object on the page but excluding the shadow of the third member; and
      calculate a shadow bounding box based on the main bounding box surrounding the second container object and at least one of the plurality of second container shadow parameters;
   the transformation matrix is further configured to calculate a second shadow transformation matrix mapping the second container object to the shadow of the second container object defined by the plurality of second container shadow parameters;
   the brush generator is further configured to:
      create a main brush comprising the second container object but excluding the shadow of the third member; and
      create a shadow brush by applying the second shadow transformation matrix to the main brush comprising the second container object; and
   the framebuffer further comprises:
      the shadow of the second container object;
      the third member after processing the third member; and
      the shadow of the third member after processing the third member.

20. The system of claim 17, wherein:
   the bounding box calculator is further configured to:
      determine a main bounding box surrounding the first member on the page, wherein the first member is a simple object; and calculate a shadow bounding box of the first member based on the main bounding box surrounding the first member and at least one of the first plurality of member shadow parameters;

the transformation matrix is further configured to calculate a shadow mapping transforming the first member to the shadow of the first member defined by the first plurality of member shadow parameters;

the brush generator is further configured to:
  create a main brush comprising the first member; and
  creating a shadow brush by applying the shadow mapping to the main brush; and the rasterizing engine is configured to:
  paint the shadow bounding box of the first member with the shadow brush; and
  paint the main bounding box surrounding the first member with the main brush comprising the first member.

* * * * *